No. 835,363. PATENTED NOV. 6, 1906.
M. MILCH.
CONSTANT CURRENT GENERATOR.
APPLICATION FILED APR. 3, 1905.
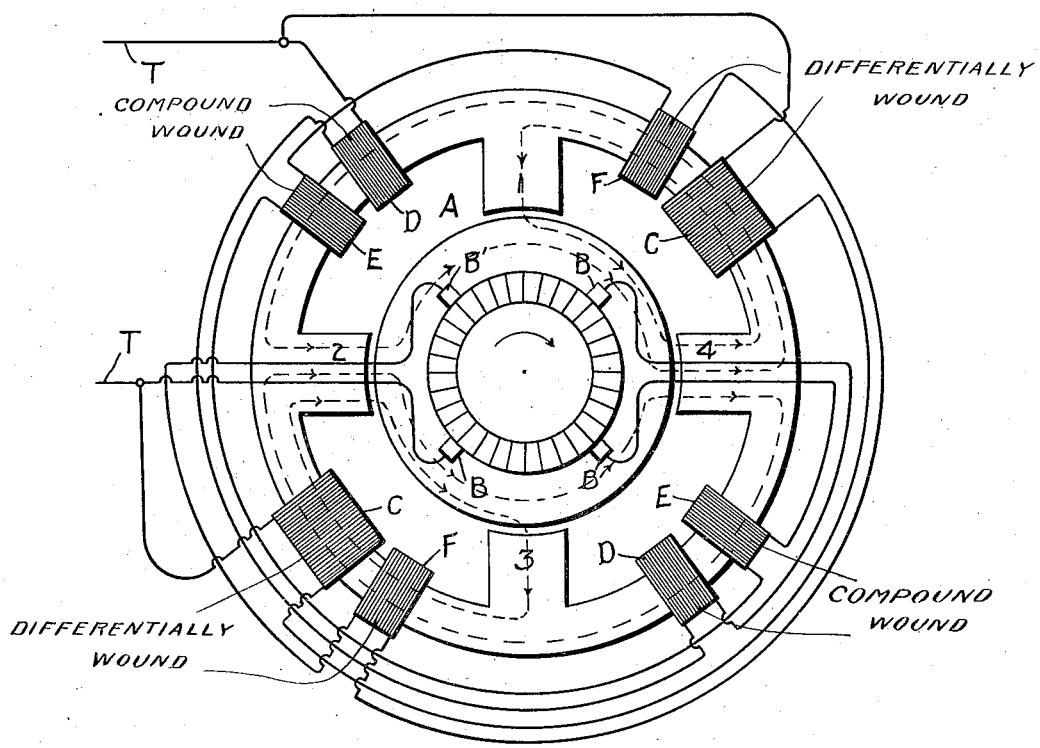
Witnesses:
Lloyd C. Bush
Helen Oxford
Inventor:
Maurice Milch.
By Albert G. Davis
Att'y.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

CONSTANT-CURRENT GENERATOR.

No. 835,363.  Specification of Letters Patent.  Patented Nov. 6, 1906.

Application filed April 3, 1905. Serial No. 253,457.

*To all whom it may concern:*

Be it known that I, MAURICE MILCH, a subject of the Emperor of Austria-Hungary, residing at Schenectady, county of Schenectady, State of New York, have invented certain new and useful Improvements in Constant-Current Generators, of which the following is a specification.

My invention relates to dynamo-electric machines; and its object is to provide a generator adapted to give a practically constant-current output, although operated at varying speeds or with a varying resistance connected across its terminals.

My invention consists in so arranging the machine that the current delivered by the machine produces a strong cross-field, leading off by a set of auxiliary brushes a current induced in the armature by the cross-field and utilizing this current for demagnetizing the main field of the machine.

My invention will best be understood by reference to the accompanying drawing, which shows somewhat diagrammatically a constant-current generator arranged in accordance with my invention.

In the drawing, A represents the armature, provided with a set of brushes B B, from which the current for the external circuit is taken.

C C represent the main-field coils, which are mounted in a field-magnet arranged with four poles. Only two main-field coils are employed, however, and these are connected so as to make the poles 1 and 2 of one polarity and the poles 3 and 4 of the other polarity. As regards the coils C C, the field-magnet is consequently bipolar, each pole being divided in two parts, the poles 1 and 2 being magnetically equivalent to a single pole and the poles 3 and 4 to a single pole of the opposite polarity.

The brushes B B, which supply the external circuit, are placed in the usual manner at or near the neutral points with respect to the poles produced by the coils C C. The coils C C are shown connected in shunt to the machine terminals T T. The current flowing through the brushes B B tends to produce a magnetization of the machine at right angles to the magnetization produced by the shunt-coils C C—that is, it tends to make the poles 1 and 4 of one polarity and 2 and 3 of the other polarity. This tendency is opposed and overwhelmed by a set of coils D D, which are connected in series with the brushes B B and with the external circuit. These coils, overpowering the magnetizing action of the armature-current between brushes B B, produce a magnetization proportional to the current in the external circuit at right angles to that produced by the shunt-coils C C. This cross-magnetization induces an electromotive force in the armature which is a maximum at the points displaced ninety degrees from the brushes B B. At these points a second set of brushes B' B' is placed, and in series with these brushes are connected two sets of coils E E and F F. The coils E E assist the coils D D in producing the cross-magnetization of the machine, while the coils F F oppose the magnetizing effect of the main coils C C.

The operation is then as follows: A slight increase in the current in the external circuit, due either to an increase of speed of the machine or a decrease of resistance in the external circuit, increases the cross-magnetizing effect of the coils D D, and consequently increases the potential between the brushes B' B'. This increased potential increases the current in the coils E E, which further increases the potential across the brushes B' B', and the increase of current in the coils F F reduces the main-field magnetization of the machine. The current output of the machine is thus kept substantially constant over a wide variation of speed or with wide variations of resistance in the external circuit.

Although I have shown the arrangement of field-coils which I believe to be best adapted to securing the desired results, nevertheless a number of variations may be made without departing from my invention. Thus, for instance, since the armature-current between the brushes B B tends to produce a cross-magnetization of the machine this current itself may be utilized for producing the cross-magnetization, the coils D D being omitted or connected, so as to assist the effect of the armature-current. This arrangement, however, would be less favorable for commutation than the arrangement which I have shown, and I prefer to use the coils D D, opposing the armature-current between the brushes B B and overpowering the armature-magnetization, so as to produce a cross-magnetization in the opposite direction. Similarly, since the current flowing in the armature between the brushes B' B' tends to demagnetize the main field the current in the armature alone might be utilized for the demagnetizing effect by simply connecting the brushes B' B' together, omitting the coils E and F. A large cross-current would then be required, since the armature-turns are comparatively few in number, and this large current would heat the armature unnecessarily and would also tend to produce sparking at the brushes B' B'. Consequently I prefer to employ the auxiliary-field coils inserted in the connection between the brushes B' B'. These field-coils may be of as great a number of turns as desired, so that the current flowing through the brushes B' B' may be very small. It is not essential that the coils E E should be employed; but they are advantageous in making the machine more responsive to variations in the armature-current. An increase of potential between the brushes B' B' increases the current-flow through the coils E E, and the increase of current-flow through the coils E E increases the potential across the brushes B' B'. The effect is consequently cumulative, and a very slight change of current in the external circuit is sufficient to produce a very marked variation in the magnetization of the machine.

I do not desire to limit myself to the particular construction and arrangement of parts here shown, but aim in the appended claims to cover all modifications which are within the scope of my invention.

What I claim as new, and desire to secure by Letters Patent of the United States, is—

1. In a dynamo-electric machine, main-field coils, an armature, commutator-brushes arranged to lead off the current induced in the armature by said main-field coils and connected to an external circuit, means for producing a cross-magnetization increasing with increase in the armature-current, auxiliary commutator-brushes arranged to lead off the current induced in the armature by said cross-magnetization, and connections whereby the current led off by said auxiliary brushes opposes the main-field magnetization.

2. In a dynamo-electric machine, main-field coils, an armature, commutator-brushes arranged to lead off the current induced in said armature by said main-field coils and connected to an external circuit, auxiliary-field coils in series with said brushes arranged to overpower the armature magnetization and to produce a cross-magnetization increasing with an increase in the armature-current, auxiliary commutator-brushes arranged to lead off the current induced in the armature by said cross-magnetization, and connections whereby the current led off by said auxiliary brushes opposes the main-field magnetization.

3. In a dynamo-electric machine, main-field coils, an armature, commutator-brushes arranged to lead off the current induced in the armature by said main-field coils and connected to an external circuit, means for producing a cross-magnetization increasing with increase in the armature-current, auxiliary commutator-brushes arranged to lead off the current induced in the armature by said cross-magnetization, and auxiliary-field coils in series with said auxiliary brushes arranged to oppose the main-field coils.

4. In a dynamo-electric machine, main-field coils, an armature, commutator-brushes arranged to lead off the current induced in the armature by said main-field coils and connected to an external circuit, means for producing a cross-magnetization increasing with increase in the armature-current, auxiliary commutator-brushes arranged to lead off the current induced in the armature by said cross-magnetization, connections whereby the current led off by said auxiliary brushes opposes the main-field magnetization, and auxiliary-field coils in series with said brushes arranged to increase said cross-magnetization.

5. In a dynamo-electric machine, main-field coils, an armature, commutator-brushes arranged to lead off the current induced in the armature by said main-field coils and connected to an external circuit, means for producing a cross-magnetization increasing with increase in the armature-current, auxiliary commutator-brushes arranged to lead off the current induced in the armature by said cross-magnetization, and two sets of auxiliary-field coils supplied from said auxiliary brushes, one set being arranged to oppose the main-field coils and the other to increase the cross-magnetization.

6. In a dynamo-electric machine, main-field coils, an armature, commutator-brushes arranged to lead off the current induced in said armature by said main-field coils and connected to an external circuit, auxiliary-field coils in series with said brushes arranged to overpower the armature magnetization and to produce a cross-magnetization increasing with an increase in the armature-current, auxiliary commutator-brushes arranged to lead off the current induced in the armature by said cross-magnetization, and a second set of auxiliary-field coils supplied from said auxiliary brushes and arranged to oppose the main-field coils.

7. In a dynamo-electric machine, main-field coils, an armature, commutator-brushes arranged to lead off the current induced in said armature by said main-field coils and connected to an external circuit, auxiliary-field coils in series with said brushes arranged to overpower the armature magnetization and to produce a cross-magnetization increasing with increase in the armature-current, auxiliary commutator-brushes arranged to lead off the current induced in the armature by said cross-magnetization, and two sets of auxiliary-field coils supplied from said auxiliary brushes, one of said sets being arranged to oppose the main-field coils and the other to increase the cross-magnetization.

8. In a dynamo-electric machine, main-field coils, an armature, commutator-brushes arranged on a line displaced substantially ninety electrical degrees from the line of the main-field magnetization, auxiliary brushes on the line of field-magnetization, and auxiliary-field coils supplied from said auxiliary brushes and arranged to produce a cross-magnetization of the machine.

In witness whereof I have hereunto set my hand this 1st day of April, 1905.

MAURICE MILCH.

Witnesses:
 BENJAMIN B. HULL,
 HELEN ORFORD.